(12) United States Patent (10) Patent No.: US 12,570,586 B2
Robinson et al. (45) Date of Patent: Mar. 10, 2026

(54) DUAL FERTILIZER COMPOSITION INCLUDING AMMONIUM ACETATE AND USES THEREOF

(71) Applicant: The Andersons Inc., Maumee, OH (US)

(72) Inventors: Terry Frank Robinson, Maumee, OH (US); Barry Fanning, Maumee, OH (US); David Dyson, Maumee, OH (US)

(73) Assignee: The Andersons Inc., Maumee, OH (US)

( * ) Notice: Subject to any disclaimer, the term of this patent is extended or adjusted under 35 U.S.C. 154(b) by 901 days.

(21) Appl. No.: 17/510,539

(22) Filed: Oct. 26, 2021

(65) Prior Publication Data

US 2022/0162137 A1 May 26, 2022

Related U.S. Application Data

(60) Provisional application No. 63/105,419, filed on Oct. 26, 2020.

(51) Int. Cl.
*C05G 1/00* (2006.01)
*C05B 7/00* (2006.01)
(Continued)

(52) U.S. Cl.
CPC ................. *C05G 1/00* (2013.01); *C05B 7/00* (2013.01); *C05C 3/00* (2013.01); *C05D 1/00* (2013.01);
(Continued)

(58) Field of Classification Search
CPC .... C05G 1/00; C05G 5/23; C05G 5/27; C05B 7/00; C05C 3/00; C05D 1/00; C05D 9/02
See application file for complete search history.

(56) References Cited

U.S. PATENT DOCUMENTS 10,029,954 B2 7/2018 Fanning
10,271,474 B1 4/2019 Miller et al.
(Continued)

FOREIGN PATENT DOCUMENTS

CN 105565983 A * 5/2016 ........... A01C 21/005
CN 111233526 A * 6/2020 ............... C12N 1/20
(Continued)

OTHER PUBLICATIONS

Tucker, Acadia. "an easy guide to fertilizing your vegetables". Ston Pier Press: Gardening News. <an easy guide to fertilizing your vegetables> Jun. 21, 2018 (Year: 2018).*
(Continued)

*Primary Examiner* — Jennifer A Smith

(74) *Attorney, Agent, or Firm* — MaxGoLaw PLLC

(57) ABSTRACT

A fertilizer is provided to promote plant growth that provides needed nutrients to a crop at planting that has a depressed freezing temperature relative to conventional liquid fertilizers. The fertilizer has a first fertilizer product including a bio-available nitrogen source, a bio-available phosphorus source, and a bio-available potassium source that is blended with a second fertilizer product including an amount of ammonium acetate. The first and second fertilizer products being present in synergistically effective amounts, such that the coordinated amounts of the first and second fertilizer products give crop yields greater than a mere additive effect obtainable through the use of the respective first and second fertilizer products alone in the same amounts. The synergistically effective amounts of the first and second fertilizer products are directed to particular crops, and depend upon the crop in question, soil conditions, ambient weather, and other factors.

14 Claims, 1 Drawing Sheet

(51) Int. Cl.

| | | |
|---|---|---|
| *C05C 3/00* | (2006.01) | |
| *C05D 1/00* | (2006.01) | |
| *C05D 9/02* | (2006.01) | |
| *C05G 5/23* | (2020.01) | |
| *C05G 5/27* | (2020.01) | |

(52) U.S. Cl.
CPC ................ *C05D 9/02* (2013.01); *C05G 5/23* (2020.02); *C05G 5/27* (2020.02)

(56) References Cited

U.S. PATENT DOCUMENTS

| | | | |
|---|---|---|---|
| 2012/0024026 A1* | 2/2012 | Varadachari | ............ C05B 13/04 71/33 |
| 2018/0297908 A1* | 10/2018 | Järvinen | ................... C05F 9/04 |
| 2018/0312449 A1 | 11/2018 | Jarvinen et al. | |

FOREIGN PATENT DOCUMENTS

| | | | | |
|---|---|---|---|---|
| DE | 4037393 A1 * | 7/1992 | .......... C25D 11/026 |
| KR | 20120061012 A * | 6/2012 | |

OTHER PUBLICATIONS

Siddique, Rafat, and Rafat Siddique. "Wood ash." Waste materials and by-products in concrete (2008): 303-321. (Year: 2008).*

* cited by examiner

DUAL FERTILIZER COMPOSITION INCLUDING AMMONIUM ACETATE AND USES THEREOF

CROSS REFERENCE TO RELATED APPLICATIONS

This application claims priority benefit of U.S. Provisional Application Ser. No. 63/105,419 filed 26 Oct. 2020, the contents of which are hereby incorporated by reference.

FIELD OF THE INVENTION

The present invention in general relates to fertilizer to promote plant growth, and in particular to a blended multi-component liquid fertilizer the components of which provide the synergistic effect of enhanced yields of crops and improved colligative properties.

BACKGROUND OF THE INVENTION

Plants have been fertilized with various materials since the dawn of agriculture. Fertilizers have included manure products as well as ammoniacal nitrogen materials (e.g., anhydrous ammonia and urea), and phosphorous fertilizers such as ammonium polyphosphate and other products derived from phosphate rock. A worldwide industry provides modern-day fertilizers of desired N-P-K grades in a bewildering variety of combinations.

Different fertilizers are applied to different crops at various stages of a crop's lifecycle. For example, some fertilizers, particularly those having a high phosphorous content, are useful to starting crops from seeds. Such "starter" fertilizers are typically applied to freshly planted crops early in the growing season, which is typically in the early spring including March and April in the northern hemisphere when weather conditions are typically unpredictable and potentially still cold with some days and nights experiencing temperatures below freezing. However, given that typical "starter" fertilizers are liquid solutions dissolved in water, such fertilizer products tend to freeze when applied in early spring and exposed to freezing temperatures common for that time of year. When these fertilizer solutions freeze, the essential nutrients for early plant growth are not effectively distributed to and received by the planted crops and thawing large volumes of liquid fertilizers in solutions is logistically problematic. The effectiveness of conventional sources of starter fertilizers to stimulate early root development also remains a matter of concern.

Additionally, the later in the year a starter fertilizer is applied, the less noticeable the plant growth response. The reason is the soil is warmer and the microorganisms are more active mineralizing nutrients into a usable form for the plant. Using a high phosphate, P value in N-P-K terms, fertilizer in close proximity to the seed provides a readily usable form of fertilizer to the plant. If there is already plenty of available fertilizer for the plant to uptake, the "starter effect" will not be as noticeable.

Thus, there exists a need for a fertilizer that provides maximum nutrition to a crop at planting that is capable of withstanding freezing temperatures to ensure that the planted crop has the opportunity to receive the essential nutrients of the fertilizer. Additionally, there is a need for an effective starter fertilizer that is amenable to application later in a growing season.

SUMMARY OF INVENTION

A fertilizer composition is provided for fertilizing a crop. The fertilizer composition includes a first fertilizer product having a bio-available phosphorus source, and a second fertilizer product having ammonium acetate. The first and second fertilizer products being present in synergistically effective amounts, such that the coordinated amounts of the first and the second fertilizer products give crop yields greater than a mere additive effect obtainable through the use of the respective first and second fertilizer products alone in the same amounts.

A process is provided for fertilizing a crop that includes applying the fertilizer composition as described to the crop, and allowing sufficient time for the fertilizer composition to promote growth of the crop.

An improvement in a liquid fertilizer is provided, wherein the improvement lies in: applying the disclosed fertilizer in sufficient ratio that results in a scratch resistance value that is at least 20% less than a normalized amount of the first fertilizer product alone as measured at −40° F.

BRIEF DESCRIPTION OF DRAWINGS

The present invention is further detailed with respect to the following drawings that are intended to show certain aspects of the present invention but should not be construed as a limit on the practice of the present invention.

DETAILED DESCRIPTION OF THE PREFERRED EMBODIMENT

Figures 1, 2, 3:
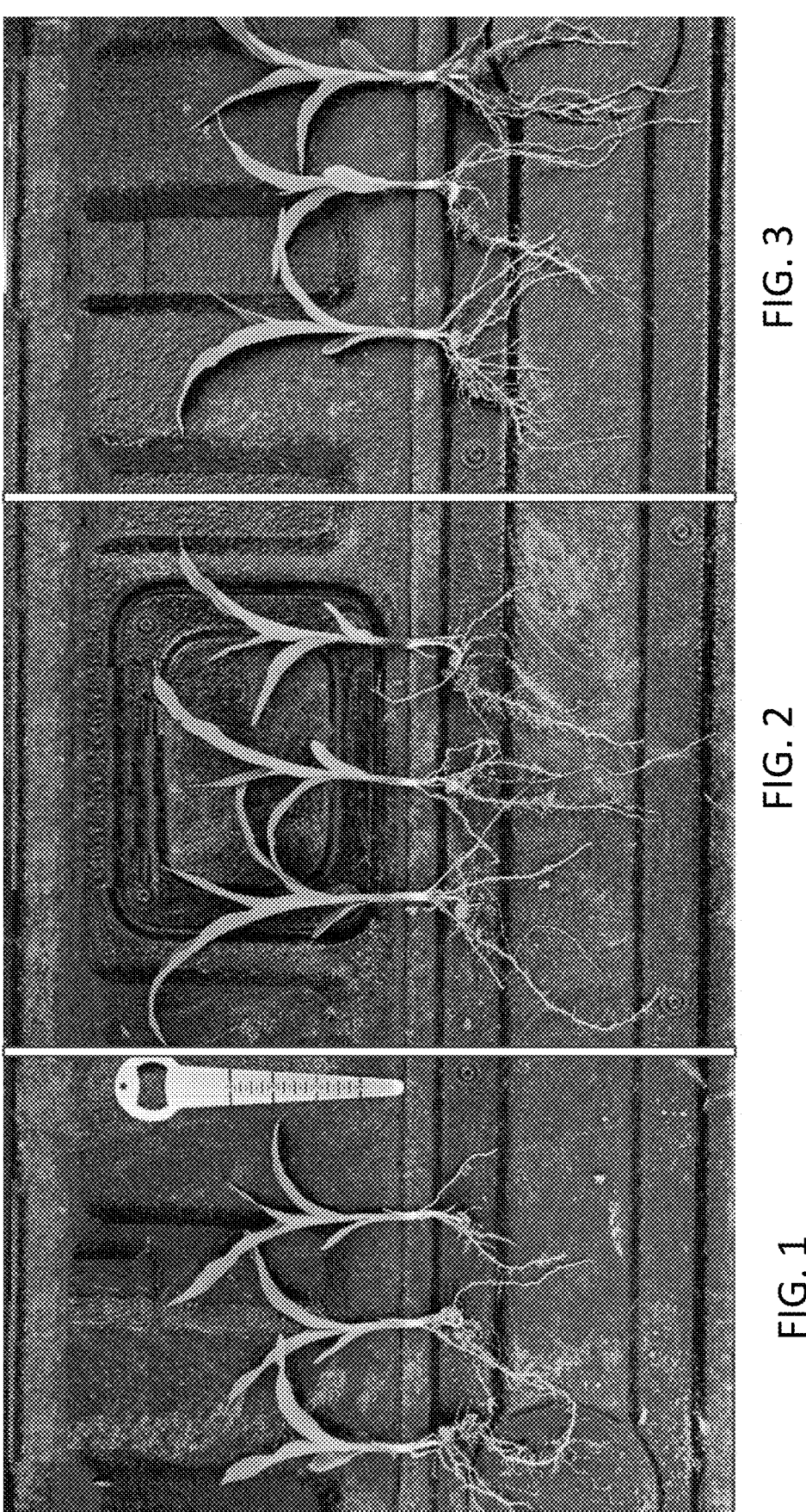
FIG. 1 illustrates plants after a set number of days treated with the first fertilizer product as applied in-furrow at 3 gallons per acre in accordance with embodiments of the invention.
FIG. 2 illustrates plants after a set number of days treated with 5% ammonium acetate fertilizer composition as applied in-furrow at 3 gallons per acre in accordance with embodiments of the invention.
FIG. 3 illustrates plants after a set number of days treated with 10% ammonium acetate fertilizer composition as applied in-furrow at 3 gallons per acre in accordance with embodiments of the invention.

The present invention has utility as a fertilizer to promote plant growth that provides needed nutrients to a crop at planting that has a depressed freezing temperature relative to conventional liquid fertilizers. The present invention ensures that the planted crop has the opportunity to receive the essential nutrients to promote early growth as measured by plant mass. According to embodiments, the present invention provides a first fertilizer product including a bio-available nitrogen source, a bio-available phosphorus source, and a bio-available potassium source that is blended with a second fertilizer product including an amount of ammonium acetate. The first and second fertilizer products being present in synergistically effective amounts, such that the coordinated amounts of the first and second fertilizer products give crop yields greater than a mere additive effect obtainable through the use of the respective first and second fertilizer products alone in the same amounts. Stated otherwise, the coordinated amounts of the first and second fertilizer products give crop yields a surprisingly greater than a mere additive effect obtainable through the use of the respective fertilizer products alone when normalized for N-P-K values. It will be appreciated that the synergistically effective amounts of the first and second fertilizer products are directed to particular crops, and that, depending upon the crop in question, soil conditions, ambient weather, and other factors, the first fertilizer product may be present in a greater amount as compared with the second fertilizer product, or vice versa. Another attribute of the present invention is that even upon freezing, the resulting mass has a scratch resistance value that is at least 20% less than a normalized amount of the first fertilizer product alone as measured at −40° F.

According to embodiments, the first fertilizer product and the second fertilizer product are premixed. According to embodiments, the first fertilizer product is in an amount that is greater than the amount of second fertilizer product present. According to embodiments, the first fertilizer product is present in an amount of 20 to 99 weight percent of the fertilizer content of an inventive composition while the second fertilizer product is present in an amount of 1 to 80 weight percent of the fertilizer content of an inventive composition.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

According to some inventive embodiments, the first fertilizer product has an N-P-K of (0-15)-(15-40)-(0-15) to provide maximum nutrition to the crop at planting.

According to embodiments of the present invention, the bio-available nitrogen source, if present, includes any of ammonia (NH₄OH in aqueous solution), ammonium nitrate, ammonium sulfate, urea, monoammonium phosphate, diammonium phosphate, sodium nitrate, calcium nitrate, potassium nitrate, nitrate of soda, urea formaldehyde, methyl ammonium phosphate, ammoniated super phosphate, uric acid, or combinations of any of the aforementioned.

According to embodiments, the bio-available phosphorus source includes orthophosphate, phosphate ($P_2O_2$), monoammonium phosphate (MAP), diammonium phosphate (DAP), calcium phosphates (normal phosphate and super phosphate), ammonium phosphate, ammonium super phosphate, ammonium polyphosphate, phosphoric acid, basic slag, rock phosphate, colloidal phosphate, bone phosphate, ammonium sulfate, ammonium thiosulfate, or combinations of any of the aforementioned.

According to embodiments, the bio-available potassium source, if present, includes potassium sulphate, potassium nitrate, potassium metaphosphate, potassium chloride, dipotassium carbonate, potassium oxide and a combination of any of the aforementioned.

According to some inventive embodiments, the inventive fertilizer composition has a specific gravity of between 1.13 and 1.62, as measured at 68° F., an equilibrium temperature of 5 to 10° F., and a pH in the range of between 3.9 and 9.4.

As used herein, "equilibrium temperature" is defined as the temperature at which the last solid crystal is observed to disappear as measured for a temperature increase rate of 3° F. per minute.

As noted above, the second fertilizer product of the inventive fertilizer composition includes ammonium acetate and hydrates thereof. Ammonium acetate is an ammonium salt obtained by reaction of ammonia with acetic acid to add nitrogen content to the N-P-K value. Ammonium acetate is a deliquescent white crystalline solid, it has a relatively low melting point (114° C.) for a salt. It has a role as a food acidity regulator and a buffer. According to some inventive embodiments, the second fertilizer product is an ammonium acetate aqueous solution that is blended with the first fertilizer product to form a solution or a suspension. Typical ammonium acetate solutions are from 5 to 45 weight percent ammonium acetate in water. According to some inventive embodiments, total N-P-K is normalized to reduce the nitrogen contribution of the first fertilizer to account for the presence of the second fertilizer.

According to some inventive embodiments, the inventive fertilizer composition additionally includes a pH buffering agent. According to other inventive embodiments, the buffering agent is added to the fertilizer composition to reduce the pH A buffering agent illustratively including citrates, acetates, humates, folates, nitrates, sulfates, mineral acids such as sulfuric acid, sulfonic acid, sulfurous acid, nitric acid, or nitrous acid; an organic acid such as glutaric acid, gluconic acid, lactic acid, glycolic acid, acrylic acid, or combinations thereof. A buffering agent is provided to typically buffer the composition pH to between 3.9 and 9.4.

According to some inventive embodiments, the inventive fertilizer composition additionally includes at least one micronutrient of calcium, magnesium, cobalt, iron, manganese, copper, boron, zinc, sulfur, molybdenum, or a combination thereof, which according to embodiments is present in the range from 0.00001-0.5 total weight percent. An inventive liquid fertilizer also includes at least one micronutrient trace metal dissolved in the liquid fertilizer in the form of a water soluble salt or a chelate thereof. Micronutrient trace metals known to function as co-enzymes or otherwise promote plant growth include calcium, magnesium, cobalt, iron, manganese, copper, chromium, boron, zinc, and molybdenum. Typically, each micronutrient is present in the range from 0.00001-0.5; where total weight percentages are for the trace micronutrient cation itself and therefore excludes the weight contribution of chelating agents or anions or hydrates. The fulvic acid or salt thereof being present in 0 to 30 total weight percent. It is of note that sulfur is implicated in protein synthesis and thus promotes plant vitality and development, including pollen development. While zinc is a co-factor in many enzymes such as those responsible for transporting calcium through the plant and is necessary for the production of chlorophyll and carbohydrate metabolism. It is appreciated that the amount of micronutrient is readily titrated to adjust for specific soil conditions. Water soluble metal chelates of the micronutrients present in an inventive liquid fertilizer illustratively include ethylenediamine disuccinic acid (EDDS), ethylenediamine dimalonic acid (EDDM), and ethylenediamine diglutaric acid (EDDG), ethylenediaminetetraacetic acid (EDTA), diethylenetriaminepentaacetic acid (DTPA), nitrilotriacetic acid (NTA), iminodiacetic acid (IDA), iminotriacetic acid (ITA), ethylenediamine (En), N,N'-diethylenediamine (Den), diethylenetriamine (DTN), diethylenetetramine (Trien), triaminotriethylene amine, triethanolamine, malonic acid, succinic acid, glutaric acid, citric acid, fumaric acid, maleic acid, aconitic acid, hydroxyethylethylene diamine triacetic acid (HEDTA), or combinations thereof. It is appreciated that while EDTA represents a most commonly used chelating agent, the problems associated therewith as a bio-accumulant are obviated by using a biodegradable chelating agent such as EDDS or EDDG.

Additional additives that are readily provided in embodiments of the liquid fertilizer illustratively include an anti-corrosion agent, anti-caking agents, stabilizers, anti-freezes, anti-foam agents, sticking agents, spreading agents, wetting agents, drift control agents, complexing agents, softening agents, and mixtures thereof and the like. Typical amounts of each additive range from 0 to 30 total weight percent, with a total weight of additive being between 0 to 50%.

According to some inventive embodiments, the inventive liquid fertilizer is capable of withstanding freezing temperatures to ensure that the planted crop has the opportunity to receive the essential nutrients of the fertilizer. According to embodiments, the inventive fertilizer composition remains usable at temperatures of 5 to 10° F. according to salt-out testing. According to embodiments, the inventive fertilizer composition remains usable at temperatures that are 5 to 10 degrees lower than the first fertilizer composition equilibrium temperature. Additionally, upon freezing the resulting mass is softer than a like composition absent the ammonium acetate thereby promoting thaw. Without intending to be bound to a particular theory, ammonium acetate modifies the colligative properties of the liquid fertilizer solution to reduce the freezing point temperature thereby keeping the solution liquid to lower temperatures.

The present invention also provides a process of fertilizing a crop that includes applying the above-described inventive fertilizer composition to a crop and allowing sufficient time for the fertilizer composition to promote growth of the crop. According to embodiments in which the inventive fertilizer composition is a liquid solution or suspension, the first fertilizer product and the second fertilizer product are mixed into the aqueous carrier with appropriate stirring and applied to the desired crop by spraying or dipping.

The present invention upon normalization of N-P-K value achieves an increase in V5 growth number of potential leaf and fruiting shoots relative to a first fertilizer alone. The improvements of the present invention are observed across a variety of crops including both C3 and C4 plants and without intending to be bound by a particular theory are implicated in soil nutrient and microbiome growth that in turn stimulate the crop as to leafing, fruiting, a combination thereof. The present invention is useful with a virtually unlimited number of crops, particularly those planted at times of the year that may experience cold temperatures. Exemplary crops include corn, wheat, oats, barley, sorghum, milo, rice, cotton, soybean, alfalfa, millet, peanuts, beans, rapeseed, sunflower, potatoes, and ornamental crops.

The first and second fertilizer products can be used in various ways, so long as both products are present on or about plants or the soil adjacent plants. For example, the fertilizer products can be separately formulated and applied to soil or plants substantially simultaneously or in serial order. In another alternative, the first and second fertilizer products can be blended together and applied in that condition. Depending upon the type of fertilizer product employed and whether a solid or a liquid, the products can be applied by spreading or broadcast.

The present invention is further detailed with respect to the following non-limiting examples. These examples are intended to illustrate specific embodiments of the present invention.

EXAMPLE 1

A crop of corn is planted in a field. The crop of corn is divided into three sections. The crop is allowed 30 days to grow with a total of 4.5 inches of water received.

In a first field section, the crop is untreated. After the 30 days and the untreated plants achieve a V4 growth stage. Upon inspection, the untreated plants have a small root bundle, are short, and have only six small leaves.

In a second field section, a first fertilizer product is applied. The first fertilizer product is a 100% orthophosphate low-salt fertilizer product, which is a starter fertilizer provided by The Andersons® that features a unique analysis of N, P, and K (7-23-4) that includes 7% ammoniacal nitrogen, 23% phosphate ($P_2O_5$), 4% soluble potash ($K_2O$), 1% sulfur, and 0.5% zinc. The specific physical properties of such a first fertilizer product include a pH of 6.6, a specific gravity of 1.32 at 68° F., a density of 11.03 lbs./gal, and an equilibrium temperature of 8° F.

The first fertilizer product is applied in-furrow at 6 gallons per acre and allowed 30 days to grow with a total of 4.5 inches of water received. After the 30 days the plants treated with the first fertilizer product achieve a V5 growth stage. Upon inspection, the plants treated with the first fertilizer product have a mid-sized root ball and are larger and have more and larger leaves as compared to the untreated control plant.

In a third field section the inventive fertilizer composition is applied. The fertilizer composition applied includes a first fertilizer product that is a 100% orthophosphate low-salt fertilizer product, which is a starter fertilizer provided by The Andersons® that features a unique analysis of N, P, and K (7-23-4) and includes 7% ammoniacal Nitrogen, 23% phosphate ($P_2O_5$), 4% soluble potash ($K_2O$), 1% sulfur, and 0.5% Zinc. The specific physical properties of such a first fertilizer product include a pH of 6.6, a specific gravity of 1.32 at 68° F., a density of 11.03 lbs./gal, and an equilibrium temperature of 8° F. The first fertilizer product is blended with a second fertilizer product comprising ammonium acetate. In the applied inventive fertilizer, the first and second fertilizer products are present in synergistically effective amounts, such that the coordinated amounts of said first and second fertilizer products give crop yields greater than a mere additive effect obtainable through the use of the respective first and second fertilizer products alone in the same amounts.

The fertilizer composition is applied in-furrow at 6 gallons per acre and allowed 30 days to grow with a total of 4.5 inches of water received. After the 30 days the plants treated with the fertilizer composition achieve a V6 growth stage. Upon inspection, the plants treated with the fertilizer composition have a large root ball and are larger and have more and larger leaves as compared to the plants treated with the first fertilizer product alone.

The applied inventive composition had a scratch test value 28% less than the first fertilizer product.

EXAMPLE 2

A crop of corn is planted in a field. The crop of corn is divided into three sections. The crop is allowed the same number of days to grow and receives an equal amount of water and equivalent weather conditions.

In a first section, a first fertilizer product is applied. The first fertilizer product is a 100% phosphorus available, low-salt fertilizer product provided by The Andersons® that features a unique analysis of N, P, and K (6-18-6) that includes 6% nitrogen including 2.2% ammoniacal Nitrogen and 3.8% urea nitrogen, 18% phosphate ($P_2O_5$), 6% soluble potash ($K_2O$), 1% sulfur, and 0.5% chelated Zinc. The specific physical properties of such a first fertilizer product include a pH of 6.5-7.2, a specific gravity of 1.26 at 68° F., a density of 10.6 lbs./gal, and an equilibrium temperature of 6° F.

The first fertilizer product is applied in-furrow at 3 gallons per acre. After a set number of days the plants treated with the first fertilizer product are shown in FIG. 1.

In a second section, a fertilizer composition is applied that includes 5% ammonium acetate blended with the first fertilizer product that is a 100% phosphorus available, low-salt fertilizer product provided by The Andersons® that features a unique analysis of N, P, and K (6-18-6) that includes 6% nitrogen including 2.2% ammoniacal Nitrogen and 0.9% urea nitrogen, 18% phosphate ($P_2O_5$), 6% soluble potash ($K_2O$), 1% sulfur, and 0.5% chelated Zinc. The specific physical properties of such a first fertilizer product include a pH of 6.5-7.2, a specific gravity of 1.26 at 68° F., a density of 10.6 lbs./gal, and an equilibrium temperature of 6° F.

The fertilizer composition is applied in-furrow at 3 gallons per acre. After the set number of days, the plants treated with the 5% ammonium acetate fertilizer composition are shown in FIG. 2.

In a third section, a fertilizer composition is applied that includes 10% ammonium acetate blended with the first fertilizer product that is a 100% phosphorus available, low-salt fertilizer product provided by The Andersons® that features a unique analysis of N, P, and K (6-18-6) that includes 6% nitrogen including 4.85% ammoniacal Nitrogen, 0.91% urea nitrogen, and 0.25% other water soluble nitrogen. 18% phosphate ($P_2O_5$), 6% soluble potash ($K_2O$), 1% sulfur, and 0.5% chelated Zinc. The specific physical properties of such a first fertilizer product include a pH of 6.5-7.2, a specific gravity of 1.26 at 68° F., a density of 10.6 lbs./gal, and an equilibrium temperature of 6° F.

The fertilizer composition is applied in-furrow at 3 gallons per acre. After the set number of days the plants treated with the 10% ammonium acetate fertilizer composition are shown in FIG. 3.

Upon inspection, the plants treated with the inventive fertilizer material, as shown in FIGS. 2 and 3 are taller, have larger root balls and longer roots, and have more and larger leaves as compared to the plants of FIG. 1 that are treated with the first fertilizer product alone.

Additionally, it is noted that the plants treated with the 5% ammonium acetate fertilizer composition of FIG. 2 are taller, have larger root balls and longer roots, and have more and larger leaves as compared to the plants of FIG. 3 that are treated with the 5% ammonium acetate fertilizer material. This finding indicates that it is not the ammonium acetate that is causing the increase in growth of the plants as compared to the plants of FIG. 1, but instead, it is the synergistically effective amounts of the first and second fertilizer products that cause the increased plant growth, such that the coordinated amounts of the first and second fertilizer products give crop yields greater than a mere additive effect obtainable through the use of the respective first and second fertilizer products alone in the same amounts.

EXAMPLE 3

A crop of corn is planted in a field in mid-July. The crop of corn is divided into three sections. Each section of crop is allowed to grow for ten days and received an equal amount of water and the same weather conditions.

In a first section, a first fertilizer product is applied. The first fertilizer product is a 100% phosphorus available, low-salt fertilizer product provided by The Andersons® that features a unique analysis of N, P, and K (6-18-6) that includes 6% nitrogen including 2.2% ammoniacal Nitrogen and 0.9% urea nitrogen, 18% phosphate ($P_2O_5$), 6% soluble potash ($K_2O$), 1% sulfur, and 0.5% chelated Zinc. The specific physical properties of such a first fertilizer product include a pH of 6.5-7.2, a specific gravity of 1.26 at 68° F., a density of 10.6 lbs./gal, and an equilibrium temperature of 6° F.

In a second section, a fertilizer composition is applied that includes 5% of a 40% ammonium acetate blended with the first fertilizer product that is a 100% phosphorus available, low-salt fertilizer product provided by The Andersons® that features a unique analysis of N, P, and K (6-18-6) that includes 6% nitrogen including 2.2% ammoniacal Nitrogen and 3.8% urea nitrogen, 18% phosphate ($P_2O_5$), 6% soluble potash ($K_2O$), 1% sulfur, and 0.5% chelated Zinc. The specific physical properties of such a first fertilizer product include a pH of 6.5-7.2, a specific gravity of 1.26 at 68° F., a density of 10.6 lbs./gal, and an equilibrium temperature of 6° F.

In a third section, a fertilizer composition is applied that includes 10% of a 40% ammonium acetate blended with the first fertilizer product that is a 100% phosphorus available, low-salt fertilizer product provided by The Andersons® that features a unique analysis of N, P, and K (6-18-6) that includes 6% nitrogen including 4.85% ammoniacal Nitrogen, 0.91% urea nitrogen, and 0.25% other water soluble nitrogen. 18% phosphate ($P_2O_5$), 6% soluble potash ($K_2O$), 1% sulfur, and 0.5% chelated Zinc. The specific physical properties of such a first fertilizer product include a pH of 6.5-7.2, a specific gravity of 1.26 at 68° F., a density of 10.6 lbs./gal, and an equilibrium temperature of 6° F.

Each of the three fertilizer products is applied to the respective crop sections in-furrow at 3 gallons per acre. After 10 days, the emerged corn plant population is counted for each section. In each section, six emerged plant population stand counts are taken. In section one, the average emerged plant population stand count is 27,333.33 plants/ac. In section two, the average emerged plant population stand count is 29,000 plants/ac. In section three, the average emerged plant population stand count is 30,666.66 plants/ac.

As an industry rule, it is expected that 7 bushels of corn result for every 1000 plants, so the increase of 1.7-3.3 thousand plants per acre treated with the inventive fertilizer formulation used in sections two and three results in approximately a 11.9-23.1 bushel increase over the first section treated with a standard fertilizer formulation.

Additionally, the plants of section two show an increase in both above ground and below ground tissue growth between 25-30% as compared to the first section treated with a standard fertilizer formulation. The plants of section three did not see the increase in tissue growth as compared to the first section treated with a standard fertilizer formulation, but this is expected given the increase in plant population observed in section three because it is understood that the higher the plant population, the smaller the plants.

EXAMPLE 4

The process of Example 1 is repeated with soybeans with similar results.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient roadmap for implementing the exemplary embodiment or exemplary embodiments. It should be understood that various changes may be made in the function and arrangement of elements without departing from the scope as set forth in the appended claims and the legal equivalents thereof.

The invention claimed is:

1. A process of fertilizing a crop comprising:

applying the fertilizer composition, the fertilizer composition comprising:

a first fertilizer product comprising a bio-available phosphorus source and having an NPK value of (0-15)-(15-40)-(0-15);

a second fertilizer product comprising ammonium acetate; and an aqueous carrier in which said first fertilizer product and said second fertilizer product are dissolved or suspended and remains sprayable at temperatures of 5 to 10° F. and free of salt precipitation;

said first and said second fertilizer products give crop yields greater than a mere additive effect obtainable through the use of the respective first and second fertilizer products alone in the same amounts; and allowing sufficient time for the fertilizer composition to promote growth of the crop.

2. The process of claim 1 wherein the bio-available phosphorus source is orthophosphate, phosphate ($P_2O_2$), monoammonium phosphate (MAP), diammonium phosphate (DAP), calcium phosphates (normal phosphate and super phosphate), ammonium phosphate, ammonium super phosphate, ammonium polyphosphate, phosphoric acid, basic slag, rock phosphate, colloidal phosphate, bone phosphate, or combinations of any of the aforementioned.

3. The process of claim 1 further comprising a bio-available nitrogen source, a bio-available potassium source, or a combination thereof.

4. The process of claim 3 wherein the bio-available nitrogen source is present and is ammonia, ammonium nitrate, ammonium sulfate, urea, monoammonium phosphate, diammonium phosphate, sodium nitrate, calcium nitrate, potassium nitrate, nitrate of soda, urea formaldehyde, methyl ammonium phosphate, ammoniated super phosphate, uric acid, or combinations of any of the aforementioned.

5. The process of claim 3 wherein the bio-available potassium source is present and is potassium sulphate, potassium nitrate, potassium metaphosphate, potassium chloride, dipotassium carbonate, potassium oxide and a combination of any of the aforementioned.

6. The process of claim 1 wherein a pH of the fertilizer composition is between 3.9 and 9.4.

7. The process of claim 1 wherein said second fertilizer product is present in an amount of 1 to 20 fertilizer weight percent.

8. The process of claim 1 wherein the second fertilizer product is present as an ammonium acetate aqueous solution.

9. The process of claim 1 further comprising a pH buffering agent.

10. The process of claim 9 wherein the pH buffering agent is any of citrates, acetates, humates, folates, nitrates, sulfates, or combinations thereof.

11. The process of claim 1 further comprising at least one micronutrient of calcium, magnesium, cobalt, iron, manganese, copper, boron, zinc, or molybdenum.

12. The process of claim 11 wherein each of the at least one micronutrient is present in the range from 0.00001 to 0.5 total weight percent.

13. The process of claim 1 wherein said first fertilizer product and said second fertilizer product are premixed.

14. An improvement in a liquid fertilizer for crop application, wherein the improvement lies in: applying a fertilizer composition comprising:

a first fertilizer product comprising a bio-available phosphorus source and having an NPK value of (0-15)-(15-40)-(0-15);

a second fertilizer product comprising ammonium acetate; and an aqueous carrier in which said first fertilizer product and said second fertilizer product are dissolved or suspended and remains sprayable at temperatures of 5 to 10° F. and free of salt precipitation;

said first and said second fertilizer products give crop yields greater than a mere additive effect obtainable through the use of the respective first and second fertilizer products alone in the same amounts;

to a crop in sufficient ratio that results in a scratch resistance value from a plant mass of the crop that is at least 20% less than a normalized amount of the first fertilizer product alone as measured at −40° F.

* * * * *